United States Patent
Crucs et al.

(10) Patent No.: US 9,443,031 B2
(45) Date of Patent: Sep. 13, 2016

(54) SYSTEM AND METHOD TO CAPTURE AN IMAGE OVER THE WEB

(71) Applicant: APTERYX, INC., Akron, OH (US)

(72) Inventors: Kevin M. Crucs, Copley, OH (US); Tyler Sutton, Stow, OH (US)

(73) Assignee: Apteryx, Inc., Akron, OH (US)

( * ) Notice: Subject to any disclaimer, the term of this patent is extended or adjusted under 35 U.S.C. 154(b) by 103 days.

(21) Appl. No.: 14/179,627

(22) Filed: Feb. 13, 2014

(65) Prior Publication Data
US 2015/0227638 A1    Aug. 13, 2015

(51) Int. Cl.
*G06F 3/00*    (2006.01)
*G06F 17/30*    (2006.01)
*H04L 29/08*    (2006.01)

(52) U.S. Cl.
CPC ......... *G06F 17/30893* (2013.01); *H04L 67/02* (2013.01); *H04L 67/12* (2013.01)

(58) Field of Classification Search
CPC .......................... G06F 17/30893; H04L 67/02
See application file for complete search history.

(56) References Cited

U.S. PATENT DOCUMENTS

| 6,166,744 | A  | * | 12/2000 | Jaszlics | G06T 17/00 345/421 |
| 7,765,271 | B1 | * | 7/2010 | Bahr | H04N 1/00222 358/1.15 |
| 2009/0027337 | A1 | * | 1/2009 | Hildreth | G06F 3/011 345/158 |
| 2010/0110275 | A1 | * | 5/2010 | Mathieu | A61B 3/14 348/360 |
| 2011/0161112 | A1 | * | 6/2011 | Keefe | G06Q 50/24 705/3 |

\* cited by examiner

*Primary Examiner* — Omar Abdul-Ali
(74) *Attorney, Agent, or Firm* — Hahn, Loeser & Parks, LLP; R. Eric Gaum; Mark N. Kittel

(57) ABSTRACT

Systems, methods, and non-transitory computer-readable media for capturing images with an imaging sensor device using a web browser of a user computer device. A user may use a user computer device to capture (i.e., acquire) images over the web. A web browser of the user computer device is used to access a web site and download a dynamic link library (DLL) to the user computer device. The DLL may be executed in a web browser environment of the user computer device to capture an image via an imaging sensor device.

20 Claims, 6 Drawing Sheets

SYSTEM AND METHOD TO CAPTURE AN IMAGE OVER THE WEB

TECHNICAL FIELD

Certain embodiments relate to image acquisition or capture. More particularly, certain embodiments relate to systems, methods, and non-transitory computer-readable media for capturing images with an imaging sensor device using a web browser of a user computer device.

BACKGROUND

When a digital image is acquired by an imaging sensor device, where image acquisition is initiated by a user computer or workstation, the user computer or workstation is often pre-configured with special software and/or hardware (e.g., from a third-party provider) to facilitate acquisition of an image. The special software and/or hardware may be compatible with only certain types of user computers or workstations. The special software and/or hardware become a permanent part of the configuration of the user computer or workstation. Furthermore, each user computer or workstation in a facility that is to be used for image acquisition may have to be pre-configured in the same manner. It is desirable to be able to acquire images using any type of user computer device and without having to permanently pre-configure each user computer device for image acquisition.

Further limitations and disadvantages of conventional, traditional, and proposed approaches will become apparent to one of skill in the art, through comparison of such systems and methods with the subject matter of the present application as set forth in the remainder of the present application with reference to the drawings.

SUMMARY

One embodiment of the invention provides a method. The method includes accessing a web site via a web browser environment on a user computer device, and downloading a dynamic link library (DLL) associated with an imaging sensor device from the web site to the web browser environment. The method further includes initiating an image capture function, via a user interface provided by the web site, in the web browser environment, and natively executing the DLL in the web browser environment, in response to the initiating, using a web browser plug-in/extension. The method also includes acquiring an image with an imaging sensor device in response to executing the DLL. The method may also include returning the acquired image to the DLL in the web browser environment. The method may further include pushing the acquired image from the web browser environment to a server computer environment associated with the web site and storing the acquired image in an image database of the server computer environment. The image may be acquired in response to executing the DLL, at least in part, by invoking a software development kit (SDK) component in an operating system environment of the user computer device to trigger the imaging sensor device through a device driver component in the operating system environment. Alternatively, the image may be acquired in response to executing the DLL, at least in part, by opening a Transmission Control Protocol/Internet Protocol (TCP/IP) connection to the imaging sensor through a computer network component.

One embodiment of the invention provides a system. The system includes a server computer environment hosting a web site, wherein the web site provides a DLL and a user interface for image acquisition. The system also includes a user computer device, having a web browser environment with a web browser plug-in/extension, providing access to the web site. The web browser environment is configured to download the DLL to the user computer device from the server computer environment upon command through the user interface. The web browser plug-in/extension is configured to execute the DLL in the web browser environment. The system further includes an imaging sensor device operatively interfacing to the user computer device, wherein the imaging sensor device is activated to acquire an image in response to execution of the DLL. The system may also include a SDK component operatively interfacing to the DLL in the web browser environment when the DLL is on the user computer device, and a device driver component operatively interfacing to the SDK component and the imaging sensor device, wherein image acquisition is accomplished via the SDK component and the device driver component upon execution of the DLL. The SDK component and the device driver component may exist in an operating system environment of the user computer device. The system may include a computer network component operatively interfacing to the DLL in the web browser environment, when the DLL is on the user computer device, and operatively interfacing to the imaging sensor device. The DLL may be configured to open a TCP/IP connection to the imaging sensor device through the computer network component to accomplish image acquisition. The computer network component may be a part of at least one of a local area network (LAN) or a wide area network (WAN). The server computer environment may include at least one digital imaging and communication in medicine (DICOM) server computer, and at least one image database operatively connected to the at least one DICOM server computer. The server computer environment may include a picture archiving and communication system (PACS). The server computer environment may include a web server computer for hosting the web site. The user computer device may include at least one of a personal computer, a mobile cellular telephone, a tablet computer, a laptop computer, or the like.

One embodiment of the invention provides a non-transitory computer-readable medium. The non-transitory computer-readable medium includes computer-readable instructions recorded thereon that are capable of being executed by a user computer device. The instructions include instructions for natively executing a DLL downloaded to the user computer device from a server computer environment, instructions for acquiring an image with an imaging sensor device operatively connected to the user computer device in response to executing the DLL, and instructions for returning the acquired image to the user computer device. The instructions may further include instructions for pushing the acquired image from the user computer device to the server computer environment. The instructions for natively executing a DLL may be configured to be executed in a web browser environment of the user computer device. The instructions for acquiring an image and the instructions for returning the acquired image may be configured to be executed in an operating system environment of the user computer device. The instructions for pushing the acquired image to the server computer environment may be configured to be executed in a web browser environment of the user computer device.

These and other novel features of the subject matter of the present application, as well as details of illustrated embodi-

DETAILED DESCRIPTION

The term "web" and "internet" are used interchangeably herein and refer to at least the World Wide Web (WWW) and the associated interconnection of computer networks that facilitate the digital communication of information. The digital pages (e.g., HTML pages) of the web are viewed using a web browser on a user computer device. The terms "server" and "server computer" are used interchangeably herein.

Figure 1:
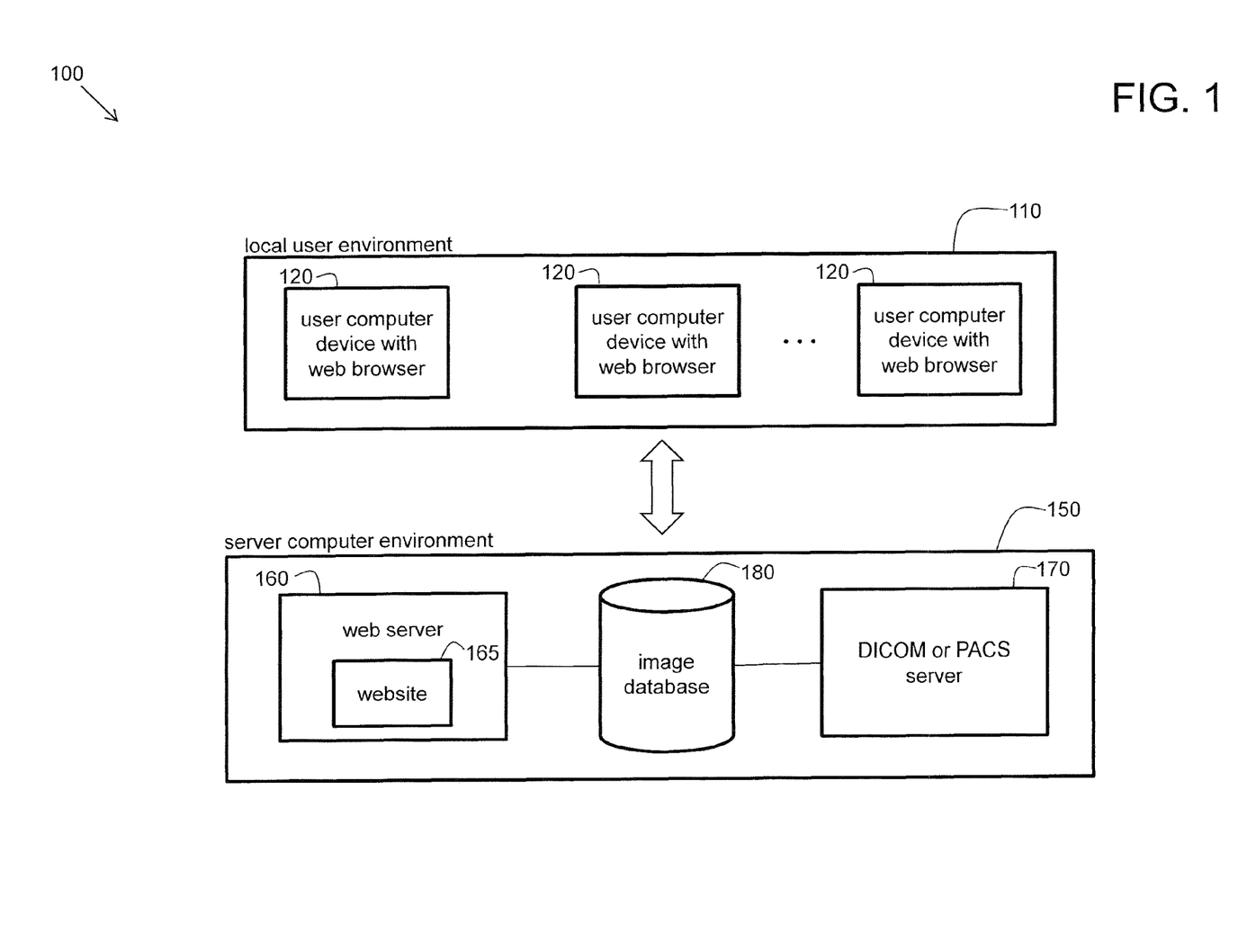
FIG. 1 illustrates a schematic block diagram of an example embodiment of a system for acquiring, storing, and accessing images.

FIG. 1 illustrates a schematic block diagram of an example embodiment of a system 100 for acquiring, storing, and accessing images. The system 100 includes a local user environment 110 and a server computer environment 150. The local user environment 110 may be located at a local hospital environment or a local multi-physician office environment, for example. The local user environment 110 includes one or more user computer devices 120, each having a web browser. A user computer device 120 may include a personal computer, a mobile cellular telephone, a tablet computer, or a laptop computer, for example, and may be used by physicians, nurses, therapists, and office workers. Other types of local user computer devices having a web browser are possible as well.

The server computer environment 150 may located within a local hospital environment, a local multi-physician office environment, or may be located at an off-site facility (e.g., "in the cloud"). The server computer environment 150 includes a web server 160 hosting a web site 165, a DICOM or PACS server 170, and an image database 180. In accordance with an embodiment, a user computer device 120 may access the web site 165 over a network (e.g., the internet) via HTTP or HTTPS protocols using the web browser of the user computer device 120. The web site 165 provides a user interface that may be used to interact with the various aspects of the server computer environment 150.

The web site 165 is directed to image acquisition, image viewing, image enhancement, and image analysis, in accordance with an embodiment. For example, in accordance with an embodiment, a user computer device 120 may be used to capture (i.e. acquire) an image using an imaging sensor device (e.g., a digital imaging sensor device), installed on the user computer device, and store the image to the image database 180 via the DICOM or PACS server 170 simply by accessing the web site 165 and using the features thereof. The ability to capture an image using the web site 165 is platform independent (i.e., independent of the user computer device) in the sense that any user computer device having a web browser may be used to capture an image by accessing the web site 165 via the web browser.

Figure 2:
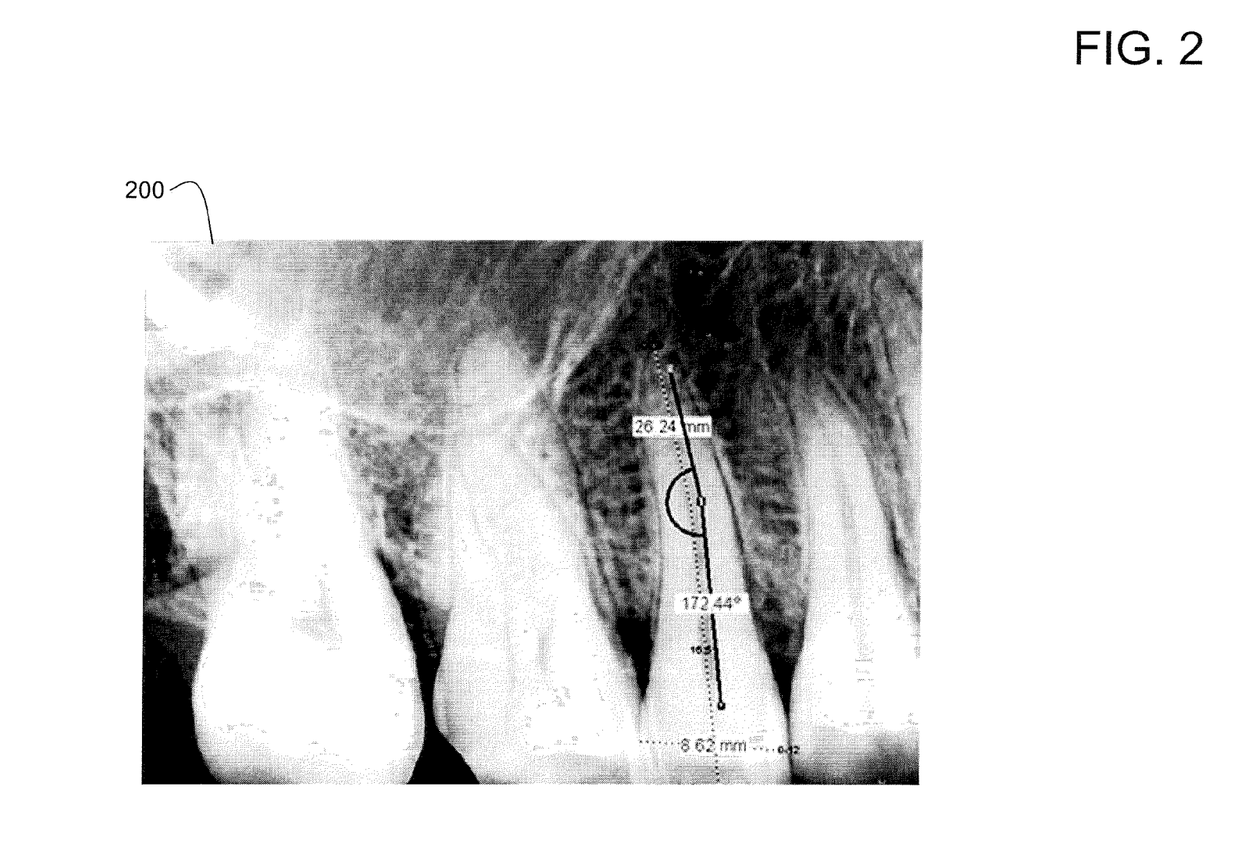
FIG. 2 illustrates an example embodiment of an image acquired by the system of FIG. 1.

FIG. 2 illustrates an example embodiment of an image 200 acquired by the system 100 of FIG. 1. The image 200 is a digital intra-oral X-ray image acquired using an imaging sensor device 310 (see FIG. 3; e.g., a digital intra-oral X-ray sensor). The image 200 is a dental image showing four teeth protruding from gum tissue of a patient, along with overlaid post-acquisition measurement information provided by a dentist using an image analysis tool provided by the web site 165. The imaging sensor device 310 is operatively connected to a user computer device 120 as discussed with respect to FIG. 3 and FIG. 5 herein.

Figure 3:
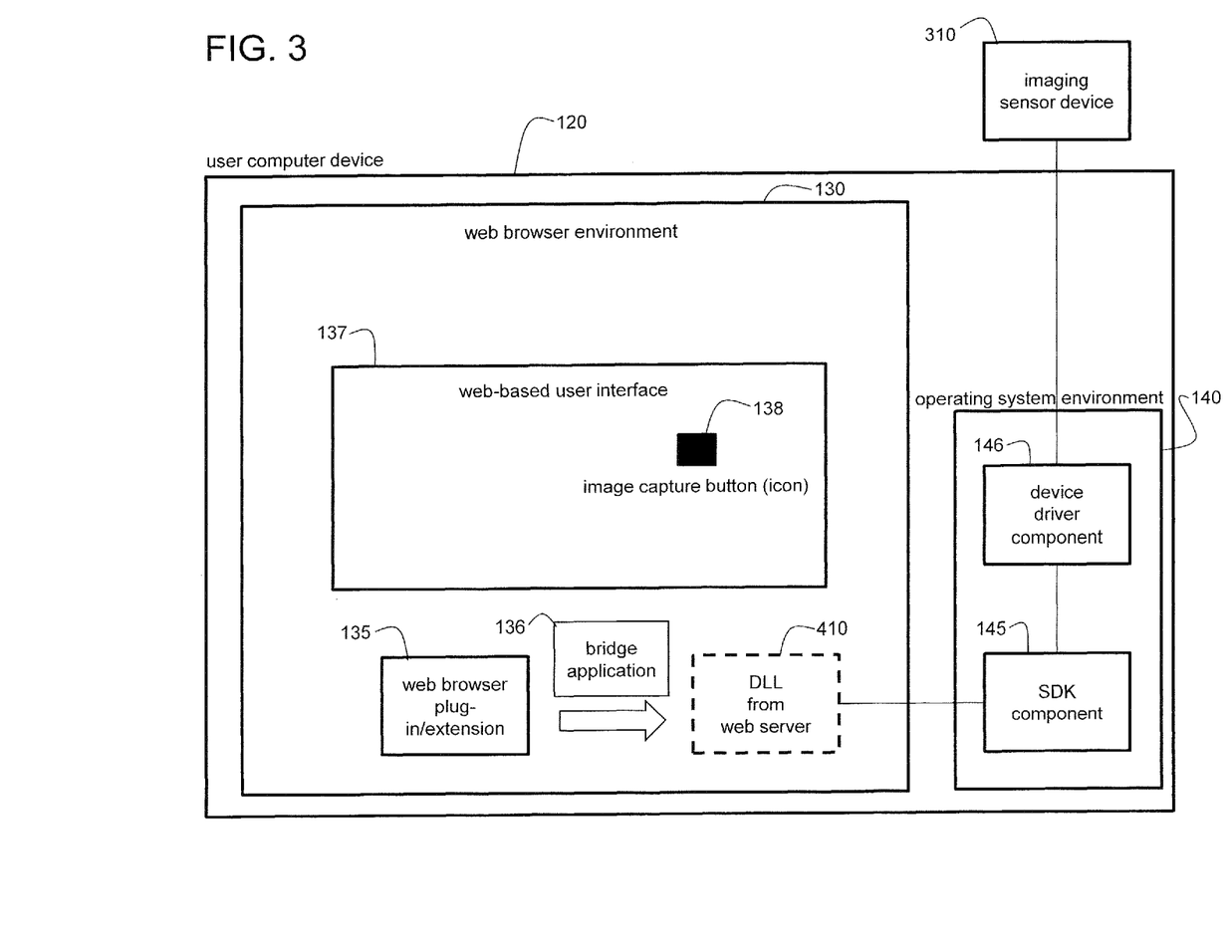
FIG. 3 illustrates a schematic block diagram of an example embodiment of a first user computer device of the system of FIG. 1 interfacing to an imaging sensor device.

FIG. 3 illustrates a schematic block diagram of an example embodiment of a first user computer device 120 of the system 100 of FIG. 1 interfacing to an imaging sensor device 310. The user computer device 120 includes a web browser environment 130 and an operating system environment 140. The web browser environment 130 includes a web browser plug-in/extension 135 that is used to call a DLL 410 to run or execute in the web browser environment. In accordance with an embodiment, one of the functions of the DLL 410 is to detect the imaging sensor device 310 that is installed on the user computer device 120.

The DLL 410 may be downloaded from the web server 165 via the web site 165 as discussed herein. The DLL 410 is shown in dashed lines in FIG. 3 to indicate that the DLL 410 is not an inherent part of the web browser environment 130 but is, instead, downloaded to the web browser environment 130 of the user computer device 120 via the web site 165 when a user selects an imaging sensor device on the web site. In accordance with an embodiment, a bridge application 136, embedded in an image application web page provided by the web site 165, runs on the web browser plug-in/extension 135 to call the DLL 410 to execute when image capture is initiated.

The web browser plug-in/extension 135 acts as a virtual machine that runs the bridge application 136 in the web browser environment 130. In accordance with an embodiment, the bridge application 136 is unique to each DLL. Therefore, when a user selects an imaging sensor device from the web site, not only is an associated DLL downloaded to the user computer device, but an associated bridge application 136 is also embedded into an image acquisition web page provided by the web site. In accordance with an alternative embodiment, the bridge application is configured to support multiple DLL's corresponding to multiple imaging sensor devices.

The web browser plug-in/extension 135, if not already present, may be installed on the user computer device 120. For example, if the user does not have the web browser plug-in/extension 135 installed and attempts to use the web site 165, the web site 165 may re-direct the user computer device 120 to another web site that allows the user to install the web browser plug-in/extension 135 (e.g., Microsoft's Silverlight™ web site).

In accordance with an embodiment, the web site 165 is accessed by the user computer device 120 using the web browser environment 130 on the user computer device 120. The web site 165 provides an image acquisition web page with a user interface 137 to facilitate the capturing of an image. For example, the user interface 137 may provide an image capture icon button 138 that a user may click (e.g., using a computer mouse or a touch screen interface) to initiate image acquisition. The image acquisition process is described in detail later herein.

The operating system environment 140 may include a SDK component 145 and a device driver component 146. The SDK component 145 and the device driver component 146 may be provided by the manufacturer of the imaging sensor device 310 and may be installed on the user computer device 120 by the user. The SDK component 145 operatively interfaces to the DLL 410 (after the DLL is downloaded to the web browser environment) and to the device driver component 146. The device driver component 146 operatively interfaces (e.g., through a cable) to the imaging sensor device 310 which may be external to the user computer device 120. In accordance with another embodiment, the imaging sensor device 310 may be a part of the user computer device 120 (e.g., the imaging sensor device may be a camera integrated into a mobile cellular telephone device).

When the DLL is not yet downloaded to the user computer device, a user may access the web site 165 and select the type of imaging sensor device 310 that the user has installed on the user computer device for acquiring images. Upon selection, a DLL 410 associated with the imaging sensor device 310 is downloaded (e.g., over the internal from the web server 160 of the server computer environment 150 to the web browser environment 130 of the user computer device 120. During an image capture operation, a user of the user computer device 120 may access the web site 165 from the web server 160 of the server computer environment. Upon accessing the web site 165, a web-based user interface 137 may appear on a display screen of the user computer device 120. The user may position the imaging sensor device 310 with respect to an anatomy (e.g., teeth) of a patient and then "click" the image capture icon 138 of the user interface 137 to initiate capturing of an image 200 by the imaging sensor device 310.

Figure 4:
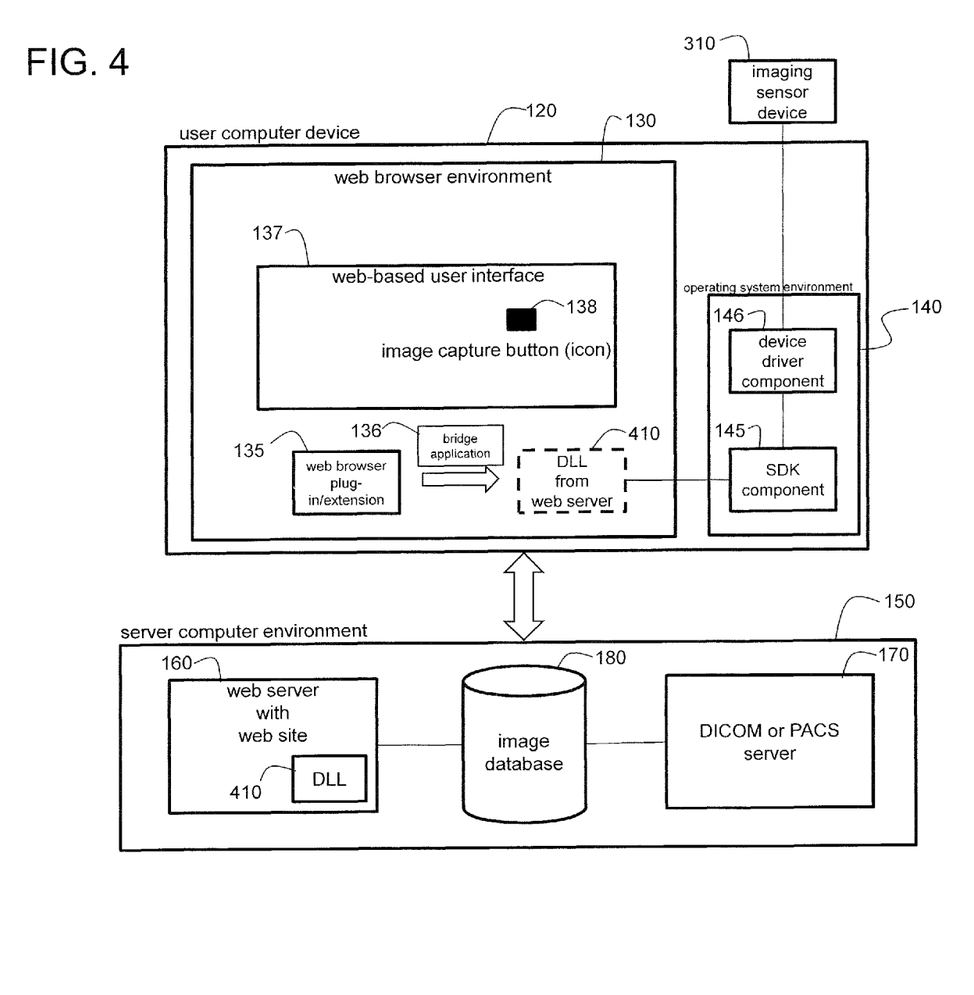
FIG. 4 illustrates a schematic block diagram of an example embodiment of the local user computer device of FIG. 3 interfacing to the server computer environment of FIG. 1.

FIG. 4 illustrates a schematic block diagram of an example embodiment of the local user computer 120 of FIG. 3 interfacing to the server computer environment 150 of FIG. 1. Once downloaded, the DLL 410 may be natively executed in the web browser environment 130 by calling the DLL 410 using the bridge application 136 running on the web browser plug-in/extension 135. As an example, the web browser plug-in/extension 135 may be Microsoft Silverlight™. The bridge application 136 is code that has been written to bridge from the managed code of the web browser plug-in/extension 135 to the native code of the DLL 410. In accordance with an embodiment, the bridge application 136 is embedded in an image acquisition web page provided by the web site 165 on the web server 165. The bridge application 136 is ported to the user computer device 120 when the image acquisition web page is loaded in the web browser environment 130 of the user computer device 120 when a user accesses the web site 165.

When executing, the DLL 410 invokes the SDK component 145 in the operating system environment 140 to trigger the imaging sensor device through a device driver component 146 in the operating system environment 140 and return the acquired image 200 to the DLL 410. The DLL 410 may further push the acquired image 200 to the server computer environment 150 where the DICOM or PACS server 170 may register and log the image 200 and store the image 200 in the image database 180. In accordance with an embodiment, once the DLL is finished executing, the DLL may be deleted from the user computer device. As a result, the DLL may be downloaded from the web site to the user computer device every time a user initiates image capture. In accordance with another embodiment, the DLL may stay on the user computer device for at least a determined period of time, allowing a user to capture multiple images without having to re-download the DLL each time. If the user of a user computer device 120 has multiple imaging sensor devices 310 of different types, the user may select those imaging sensor devices 310 via the web site 165, resulting in the downloading of a unique DLL for each selected imaging sensor device.

Figure 5:
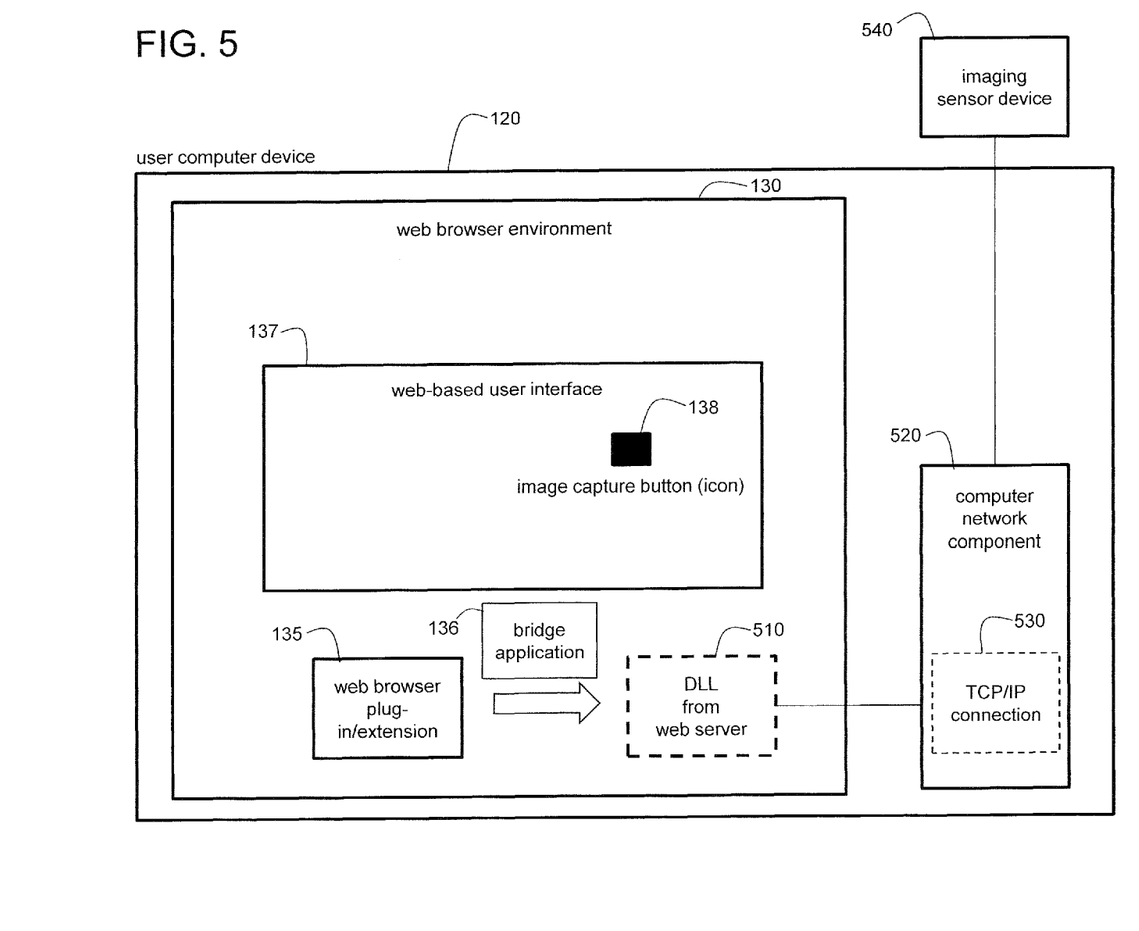
FIG. 5 illustrates a schematic block diagram of an example embodiment of a second user computer device of the system of FIG. 1 interfacing to an imaging sensor device.

FIG. 5 illustrates a schematic block diagram of an example embodiment of a second user computer device 120 of the system 100 of FIG. 1 interfacing to an imaging sensor device 540. The user computer device of FIG. 5 may be similar to the user computer device of FIG. 3, except that the user computer device of FIG. 5 does not employ a SDK component or a device driver component in an operating system environment to capture an image. Instead, a computer network component 520 is employed as discussed below herein. The computer network component 520 may be, for example, a local area network (LAN) component or a wide area network (WAN) component. The imaging sensor device 540 may be similar to the imaging sensor device 310 of FIG. 3, except that the imaging sensor device 540 is TCP/IP based and, therefore, does not require a device driver component.

The user computer device 120 includes a web browser environment 130 that includes a web browser plug-in/extension 135 that is used to run a bridge application 136 to call a DLL 510 to be executed in the web browser environment 130. The DLL 510 is downloaded from the web server 160 via the web site 165, as discussed herein, when the imaging sensor device 540 is selected via the web site 165. The DLL 510 is shown in dashed lines in FIG. 5 to indicate that the DLL 510 is not an inherent part of the web browser environment 130 but is, instead, downloaded to the web browser environment 130 of the user computer device 120 via the web site 165.

In accordance with an embodiment, the web site 165 is accessed by the user computer device 120 using the web browser environment 130 on the user computer device 120. The web site 165 provides a user interface 137 to facilitate the capturing of an image. For example, the user interface 137 may provide an image capture icon button 138 that a user may click (e.g., using a computer mouse or a touch screen interface) to initiate image acquisition. The image acquisition process is described in detail later herein.

The user computer device 120 includes a computer network component 520 that operatively interfaces to the DLL 510 (after the DLL is downloaded to the web browser environment) and also interfaces (e.g., through a cable) to the imaging sensor device 540 which may be external to the user computer device 120. In accordance with another embodiment, the imaging sensor device 540 may be a part of the user computer device 120 (e.g., the imaging sensor device may be a camera integrated into a mobile cellular telephone device).

During an image capture operation, a user of the user computer device 120 may access the web site 165 from the web server 160 of the server computer environment. Upon accessing the web site 165, a web-based user interface 137 may appear on a display screen of the user computer device 120. The user may position the imaging sensor device 540 with respect to an anatomy (e.g., teeth) of a patient and then "click" the image capture icon 138 of the user interface 137 to initiate capturing of an image 200 by the imaging sensor device 540.

In accordance with an embodiment, when the image capture icon 138 is selected by the user, the DLL 510 is natively executed on the user computer device 120 in the web browser environment 130 using the bridge application 136 running on the web browser plug-in/extension 135. When the DLL 510 is executed, a TCP/IP connection 530 is opened to the imaging sensor device 540 through the computer network component 520 to trigger the imaging sensor device and return the acquired image 200 to the DLL 410. The DLL 510 may further push the acquired image 200 to the server computer environment 150 where the DICOM or PACS server 170 may register and log the image 200 and store the image 200 in the image database 180.

Figure 6:
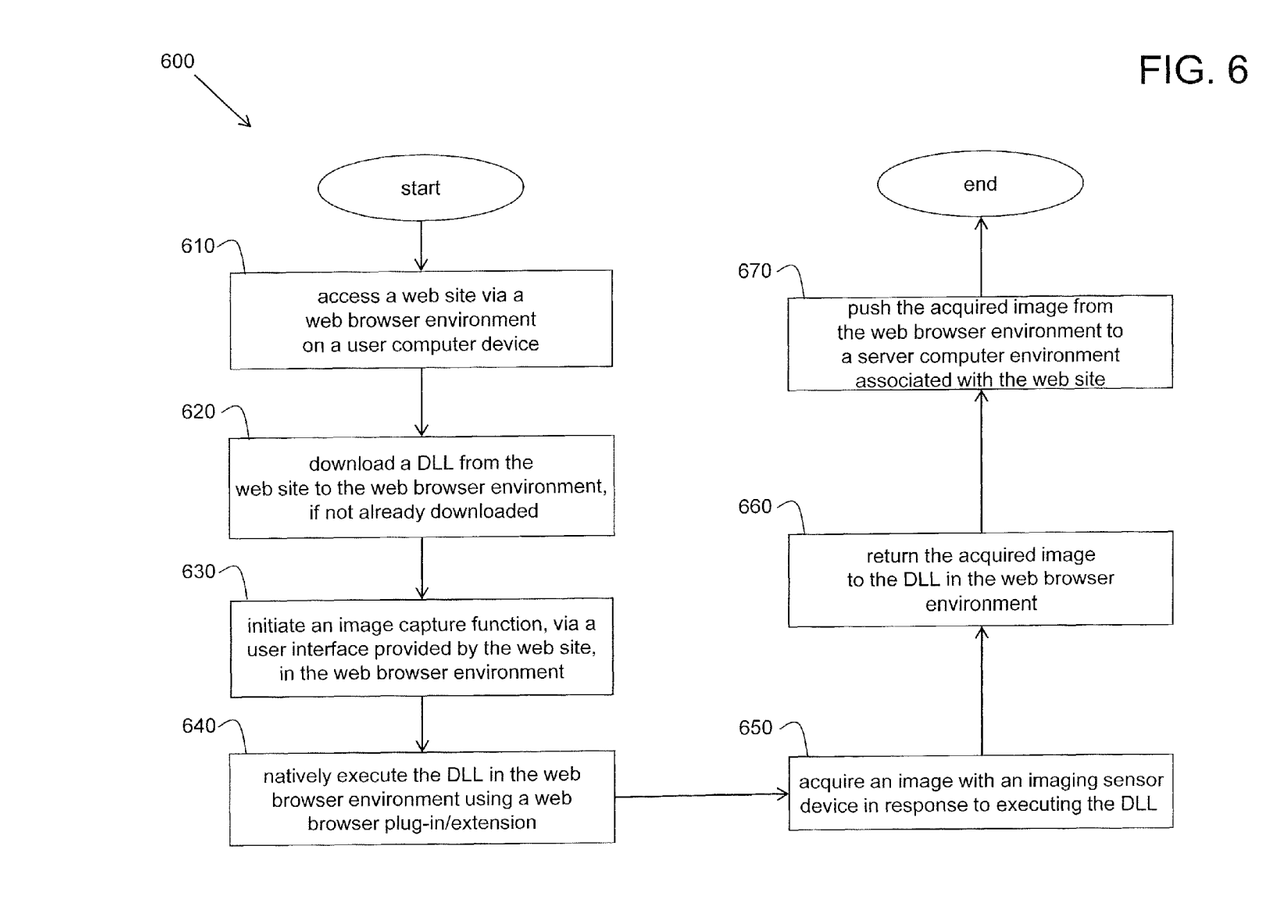
FIG. 6 illustrates a flow chart of an example embodiment of a method to acquire an image using the user computer device configuration of FIG. 3 or FIG. 5.

FIG. 6 illustrates a flow chart of an example embodiment of a method 600 to acquire an image using the user computer device configuration of FIG. 3 or FIG. 5. In step 610 of the method 600, a web site is accessed via a web browser environment on a user computer device. In step 620, a DLL is downloaded from the web site to the web browser environment, if not already downloaded. The DLL may be downloaded in response to the user selecting an imaging sensor device via the web site. In step 630, an image capture function is initiated, via a user interface provided by the web site, in the web browser environment. In step 640, the DLL is natively executed in the web browser environment using a web browser plug-in/extension in response to the initiating. In step 650, an image is acquired by an imaging sensor device in response to the execution of the DLL. In step 660, the acquired image is returned to the DLL in the web browser environment. In step 670, the acquired image is pushed from the web browser environment of the user computer device to a server computer environment associated with the web site.

An acquired image may be pushed to the server computer environment 150 via a DICOM protocol or a non-DICOM protocol (e.g., HTTP or HTTPS). In accordance with an embodiment, the web site 165 provides functionality that allows the user to communicate the acquired image via a DICOM protocol to the server computer environment. In accordance with another embodiment, the DLL communicates the acquired image via a DICOM protocol to the server computer environment. In accordance with yet another embodiment, the acquired image is communicated to the server computer environment via a HTTP or HTTPS protocol.

In accordance with an embodiment, the web site 165 provides functionality that allows a user to email an acquired image, print an acquired image, export an acquired image to a file, and burn the acquired image to, for example, a compact disk (CD). Furthermore, in accordance with an embodiment, the web site 165 provides functionality that allows a user to enhance an acquired image through, for example, filtering. For example, a user may desire to apply spatial filtering to an image to enhance edges within the image. Furthermore, a user may desire to adjust brightness, contrast, and gamma parameters of an image using image enhancement functionality of the web site 165. Also, in accordance with an embodiment, the web site 165 provides functional tools that allows a user to perform measurements on an acquired image (e.g., as shown in FIG. 2). Such measurements may include distance measurements of length and width across an anatomical feature, for example.

In accordance with an embodiment, a digital certificate may need to be accessed from the web site 165 and installed on the user computer device 120 before the bridge application 136 may be run. A routine provided by the web site may be run to install the digital certificate. Such a digital certificate may provide added system security by requiring a user to log in and/or provide other identifying information in order to install the digital certificate.

In summary, systems, methods, and non-transitory computer-readable media for capturing images with an imaging sensor device using a web browser of a user computer device are disclosed. A user may use a user computer device to capture (i.e., acquire) images over the web. A web browser of the user computer device is used to access a web site and download a dynamic link library (DLL) to the user computer device. The DLL may be executed in a web browser environment of the user computer device to capture an image via an imaging sensor device.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A method, comprising:
accessing a web site via a web browser environment on a user computer device;
detecting, via the web browser environment, an imaging sensor device operatively connected to the user computer device;
downloading a dynamic link library (DLL) associated with the imaging sensor device from the web site to the web browser environment;
initiating an image capture function, via a user interface provided by the web site, in the web browser environment;
natively executing the DLL in the web browser environment, in response to the initiating, using a web browser plug-in/extension; and
acquiring an image with the imaging sensor device in response to executing the DLL.

2. The method of claim 1, further comprising returning the acquired image to the DLL in the web browser environment.

3. The method of claim 2, further comprising pushing the acquired image from the web browser environment to a server computer environment associated with the web site.

4. The method of claim 3, further comprising storing the acquired image in an image database of the server computer environment.

5. The method of claim 1, wherein the image is acquired in response to executing the DLL, at least in part, by invoking a software development kit (SDK) component in an operating system environment of the user computer device to trigger the imaging sensor device through a device driver component in the operating system environment.

6. The method of claim 1, wherein the image is acquired in response to executing the DLL, at least in part, by the DLL opening a Transmission Control Protocol/Internet Protocol (TCP/IP) connection to the imaging sensor through a computer network component.

7. A system, comprising:
a server computer environment hosting a web site, wherein the web site provides a dynamic link library (DLL) and a user interface for image acquisition,
a user computer device, having a web browser environment with a web browser plug-in/extension, providing access to the web site, and
an imaging sensor device operatively interfacing to the user computer device, wherein the imaging sensor device is activated to acquire an image in response to execution of the DLL;
wherein the web browser environment is configured to detect the imaging sensor device associated with the DLL and to download the DLL to the user computer device from the server computer environment upon command through the user interface, and
wherein the web browser plug-in/extension is configured to execute the DLL in the web browser environment.

8. The system of claim 7, further comprising:
a software development kit (SDK) component operatively interfacing to the DLL in the web browser environment when the DLL is on the user computer device; and
a device driver component operatively interfacing to the SDK component and the imaging sensor device, wherein image acquisition is accomplished via the SDK component and the device driver component upon execution of the DLL.

9. The system of claim 8, wherein the SDK component and the device driver component exist in an operating system environment of the user computer device.

10. The system of claim 7, further comprising a computer network component operatively interfacing to the DLL in the web browser environment, when the DLL is on the user computer device, and operatively interfacing to the imaging sensor device, wherein the DLL is configured to open a Transmission Control Protocol/Internet Protocol (TCP/IP) connection to the imaging sensor device through the computer network component to accomplish image acquisition.

11. The system of claim 10, wherein the computer network component is part of at least one of a local area network (LAN) or a wide area network (WAN).

12. The system of claim 7, wherein the server computer environment includes:
at least one digital imaging and communications in medicine (DICOM) server computer; and
at least one image database operatively connected to the at least one DICOM server computer.

13. The system of claim 7, wherein the server computer environment includes a picture archiving and communication system (PACS).

14. The system of claim 7, wherein the server computer environment includes a web server computer for hosting the web site.

15. The system of claim 7, wherein the user computer device includes at least one of a personal computer, a mobile cellular telephone, a tablet computer, and a laptop computer.

16. A non-transitory computer-readable medium having computer-readable instructions recorded thereon that are capable of being executed by a user computer device, said instructions comprising:
instructions for detecting an imaging sensor device operatively connected to the user computer device;
instructions for natively executing a dynamic link library (DLL) associated with the imaging sensor device and downloaded to the user computer device from a server computer environment;
instructions for acquiring an image with the imaging sensor device in response to executing the DLL; and
instructions for returning the acquired image to the user computer device.

17. The non-transitory computer-readable media of claim 16, further comprising instructions for pushing the acquired image from the user computer device to the server computer environment.

18. The non-transitory computer-readable media of claim 16, wherein the instructions for natively executing a DLL are configured to be executed in a web browser environment of the user computer device.

19. The non-transitory computer-readable media of claim 16, wherein the instructions for acquiring an image and the instructions for returning the acquired image are configured to be executed in an operating system environment of the user computer device.

20. The non-transitory computer-readable media of claim 17, wherein the instructions for pushing the acquired image to the server computer environment are configured to be executed in a web browser environment of the user computer device.

* * * * *

UNITED STATES PATENT AND TRADEMARK OFFICE
CERTIFICATE OF CORRECTION

| | | |
|---|---|---|
| PATENT NO. | : 9,443,031 B2 | Page 1 of 1 |
| APPLICATION NO. | : 14/179627 | |
| DATED | : September 13, 2016 | |
| INVENTOR(S) | : Kevin M. Crucs et al. | |

It is certified that error appears in the above-identified patent and that said Letters Patent is hereby corrected as shown below:

In the Specification

In Column 5, Line 27 - replace "internal" with "internet"

Signed and Sealed this
Eleventh Day of April, 2017

Michelle K. Lee
*Director of the United States Patent and Trademark Office*